(12) United States Patent
Yang et al.

(10) Patent No.: US 11,556,884 B1
(45) Date of Patent: Jan. 17, 2023

(54) PRIVACY-PRESERVING IDENTITY-VALIDATED TRANSACTIONS

(71) Applicant: Amazon Technologies, Inc., Seattle, WA (US)

(72) Inventors: Shao-Wen Yang, Seattle, WA (US); Jin Li, Seattle, WA (US); Qianchao Ban, Seattle, WA (US); Xingang Guo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 715 days.

(21) Appl. No.: 16/450,352

(22) Filed: Jun. 24, 2019

(51) Int. Cl.
*G06Q 10/08* (2012.01)
*H04W 4/021* (2018.01)
*H04L 9/08* (2006.01)

(52) U.S. Cl.
CPC ..... *G06Q 10/0833* (2013.01); *G06Q 10/0832* (2013.01); *H04L 9/0825* (2013.01); *H04W 4/021* (2013.01)

(58) Field of Classification Search
CPC ............ G06Q 10/0833; G06Q 10/0832; H04L 9/0825; H04W 4/021
USPC ........................................................ 705/333
See application file for complete search history.

(56) References Cited

U.S. PATENT DOCUMENTS

| | | | | |
|---|---|---|---|---|
| 8,844,001 B2 * | 9/2014 | Hao | ................. | H04N 21/41407 726/4 |
| 9,699,606 B1 * | 7/2017 | Bhatia | ................. | G06Q 10/083 |
| 11,115,629 B1 * | 9/2021 | Lemberger | .............. | G10L 13/00 |
| 2002/0046173 A1 * | 4/2002 | Kelly | ..................... | G06Q 10/08 705/50 |
| 2015/0151912 A1 * | 6/2015 | Mountz | ................ | G06Q 10/087 700/218 |
| 2015/0348004 A1 * | 12/2015 | Eramian | ............... | G06F 16/951 705/40 |
| 2016/0104098 A1 * | 4/2016 | Matula | ................... | H04H 20/53 705/330 |
| 2017/0230831 A1 * | 8/2017 | Canis | .................. | H04W 12/082 |
| 2017/0344998 A1 * | 11/2017 | Kohli | .................... | H04W 12/08 |
| 2018/0096270 A1 * | 4/2018 | High | .................. | G07C 9/00896 |
| 2018/0165637 A1 * | 6/2018 | Romero | ............ | G06Q 10/0833 |
| 2019/0007949 A1 * | 1/2019 | Myers, III | ............ | H04W 40/34 |
| 2019/0050805 A1 * | 2/2019 | Munafo | ............... | G08G 5/0026 |
| 2019/0279151 A1 * | 9/2019 | Felice | .................... | G07C 9/257 |
| 2020/0035050 A1 * | 1/2020 | Carter | .................. | H04W 4/023 |
| 2020/0080865 A1 * | 3/2020 | Ervin | ................. | G01C 21/3667 |
| 2020/0219348 A1 * | 7/2020 | Hanlon | ................ | H04W 4/029 |
| 2021/0073716 A1 * | 3/2021 | Dearing | ............ | G07C 9/00174 |
| 2021/0216619 A1 * | 7/2021 | Helferich | ................. | G07C 9/28 |

* cited by examiner

*Primary Examiner* — Fateh M Obaid
(74) *Attorney, Agent, or Firm* — Thomas | Horstemeyer, LLP (57) ABSTRACT

Disclosed are various embodiments for anonymously validating the identities of multiple parties participating a transaction. In one embodiment, a system is configured to determine a location of the system is within a proximity threshold of a location and transmit an arrival indication to a remote computing device. The system is also configured to receive an encryption key from the remote computing device and detect a client device located at the location. The encryption key can be transmitted to the client device for validation that the location of the computing device is the location.

17 Claims, 6 Drawing Sheets

PRIVACY-PRESERVING IDENTITY-VALIDATED TRANSACTIONS

BACKGROUND

In a product fulfillment context, delivery confirmation involves ensuring that ordered products are delivered to the appropriate recipients at their specified delivery location. Delivery agents can use global positioning system (GPS) devices to provide a route to a delivery address provided by the intended recipient. Even with GPS systems, delivery agents can have difficulty identifying the appropriate physical location of the delivery address.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to anonymously validating the identities of multiple parties involved in a transaction using encryption keys. In one non-limiting example, the embodiments can be used to anonymously validate the identities of a delivery agent and a package recipient at a delivery location during a delivery. In a product fulfillment context, service providers may desire to track successful delivery confirmations. A successful delivery confirmation can represent whether a particular package was delivered to the correct recipient at a specified delivery location. In many circumstances, a delivery agent may fail to deliver a package to the correct recipient for a variety of reasons. For example, the intended recipient may have a delivery address located in an environment in which global positioning system (GPS) devices are prone to provide inaccurate location information, such as in dense urban environments. In other examples, the delivery tools that use geo-fence boundaries may not be precise enough or may be unreliable for detecting the correct placement of a package at a delivery location. In other examples, the provided delivery address may have errors which can lead to the delivery agent dropping off the package at an incorrect address.

Accordingly, in one use-case scenario, the various embodiments of the present disclosure can be used as an optional service for customers to anonymously validate the identity of a delivery agent and a package recipient during a delivery by performing a validation process between one or more client devices located at the delivery location and a mobile device used by a delivery agent. For example, a tablet device of a delivery agent can communicate with one or more home appliances or other Internet of Things (IoT) devices of the intended recipient to validate that the delivery agent is at the proper location for dropping off an ordered package. In this example, a home appliance can represent appliances that are accessible via one or more networks or communication channels. Some non-limiting examples of network-accessible home appliances may include refrigerators, security cameras, doorbells, security control panels, light controllers, televisions, voice assistant devices, and other suitable Iot devices. In other cases, mobile devices located at the delivery location can also be used to provide identity validation for the tablet of the delivery agent. Further, although specific customer data is not provided to outside entities, customers can also decide to opt-in or opt-out of the delivery validation service of the present disclosure. In the following discussion, a general description of the system and its components is provided, followed by a discussion of the operation of the same.

In another use-case scenario, the embodiments of the present disclosure can be used to validate the identity one or more parties participating in a financial transaction. For example, a first party may want to validate the identity of a second party prior to participating in the transaction. The validation of the second party's identity may be useful in order to avoid participating in a financial transaction with the wrong party, which may occur from accidental circumstances or in situations where the second party has fraudulent motives.

Figure 1A:
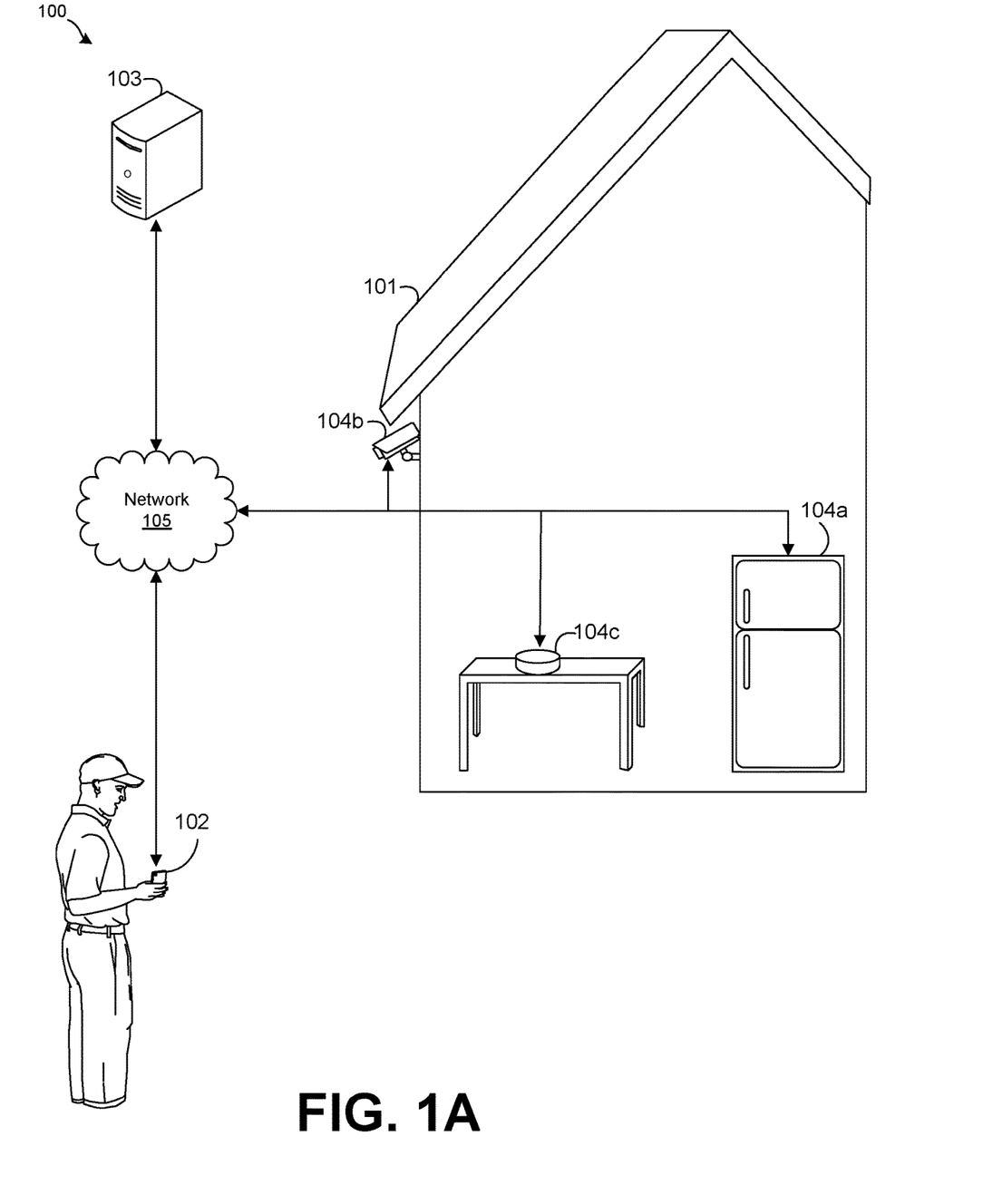
FIG. 1A is a drawing of an example scenario in which a delivery agent is attempting to validate a delivery location according to various embodiments of the present disclosure.

Beginning with FIG. 1A, shown is a pictorial drawing of an example scenario 100 in which a delivery agent is attempting to use a validation service to verify a delivery location 101 for a delivery. In this example, it is assumed that a customer has placed an order for a product, in which a delivery location 101 (e.g. a mailing address) has been provided. It is also assumed that the customer has previously selected during the purchase of the product to allow the delivery agent to use the validation service for the delivery.

As depicted in FIG. 1A, the delivery agent has a delivery device 102 to monitor the current location of the delivery agent along a route to the delivery location 101. Upon arriving within a threshold distance of the delivery location 101, the delivery agent can attempt to anonymously validate that the current location of the delivery agent is the delivery location 101 for the customer's package. At this stage, the delivery device 102 can receive a public key from a computing environment (e.g. a backend server) 103, which was received by the computing environment 103 from one or more client devices 104 located at the delivery location 101.

Next, the delivery device 102 can attempt to identify one or more client devices 104 at the delivery location 101 by scanning a network 105 that is accessible to the client devices 104 at the delivery location 101. In this depicted scenario, a first client device 104a is depicted as a refrigerator, and a second client device 104b is depicted as a security camera. A third client device 104c is depicted as a voice assistant device.

In one scenario, the delivery device 102 is able to identify at least one of the client devices 104. The delivery device 102 can then transmit the public key to the identified client device 104 for validation through the network 105. If the public key is validated by the client device 104, the identified client device 104 can transmit a validation notification to the delivery device 102. The validation notification can represent that the delivery agent is at the appropriate physical location for leaving the package. Thus, the delivery agent has verified that he or she is at the proper delivery location 101 without exchanging identity information of the delivery agent (e.g., driver name, driver identifier, etc.) or the customer (e.g., customer name, customer identifier, customer user account, etc.).

In another scenario, after transmitting the public key to the identified client devices 104, the delivery device 102 may receive a failed validation notification from the client devices 104. The failed validation notification can indicate to the delivery agent that he or she is not at the expected delivery location of the customer. At this point, the delivery agent may reassess how to locate the expected delivery location for the package. The delivery agent may also consider classifying the delivery attempt as a failure due to a failure to validate the delivery or due to the customer providing an incorrect delivery address.

Figure 1B:
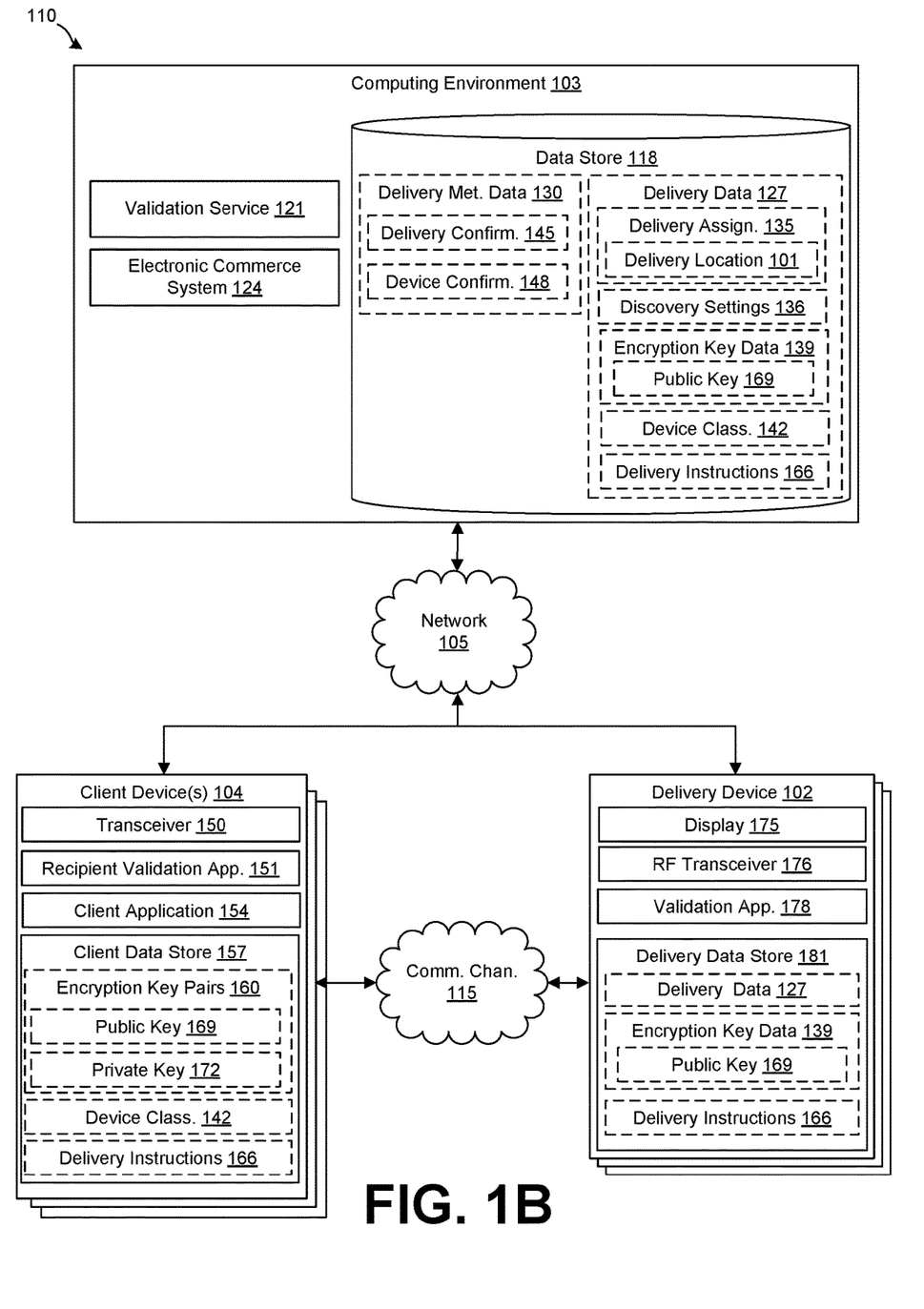
FIG. 1B is a drawing of a networked environment according to various embodiments of the present disclosure.

With reference to FIG. 1B, shown is a networked environment 110 according to various embodiments. The networked environment 110 includes a delivery device 102, a computing environment 103, and a client device 104, which are in data communication with each other via a network 105. The network 105 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Additionally, the delivery device 102 and the client device 104 may be in data communication with each other via a communication channel 115. In some respects, the communication channel 115 can represent a direct peer-to-peer communication channel between one or more client devices 104 and the delivery device 102. In some examples, the communication channel 115 can include Wi-FI network, a Bluetooth network, a Zigbee network, a Near Field Communication (NFC) network, and other suitable wireless protocols. In the context of the present disclosure, the communication channel 115 can also be referred to as a network for data communications.

In other examples, the communication channel 115 can represent a communication channel 115 for transmitting data by way of sound wave signals, pulsing light waves, and other suitable means. For example, the sound waves can be embedded with data for transmission between the delivery device 102 and the client device 104. In other cases, a light signal can be modulated to encode data for transmission between the client device 104 and the delivery device 102.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 118 that is accessible to the computing environment 103. The data store 118 may be representative of a plurality of data stores 118 as can be appreciated. The data stored in the data store 118, for example, is associated with the operation of the various applications and/or functional entities described below.

The components executed on the computing environment 103, for example, include a validation service 121, an electronic commerce system 124, and other applications, services, processes, systems, engines, or functionality not discussed in detail herein. The validation service 121 can be executed to anonymously validate that the appropriate delivery driver is at the correct delivery location for a delivery of a package. The validation service 121 can ensure that information related to an identity of the delivery agent and an identity of the package recipient are not exchanged between each other, which preserves privacy during in the validation process. The electronic commerce system 124 can be executed to receive product orders and coordinate delivery of the product orders.

The data stored in the data store 118 includes, for example, delivery data 127, delivery metric data 130, and potentially other data. The delivery data 127 can represent data communicated to the delivery device 102 to aid in delivery of a package for an intended recipient. The delivery data 127 may include a delivery assignment 135, discovery settings 136, encryption key data 139, device classification 142, and other delivery data.

The delivery assignment 135 can include information related to the delivery of a package to a recipient. Particularly, the delivery assignment 135 can also include data related to a delivery location 101 for a package and a particular delivery agent that is assigned the task of delivering the package at the delivery location 101. The delivery location 101 can represent location information for directing the delivery agent to deliver a package to an intended recipient. The delivery location 101 can include a mailing address, geographic coordinates, a geo-fence boundary, and other location identifying information.

The geographic coordinate can refer to a longitude and a latitude of a delivery location 101 for delivery, such as global navigation satellite system (GNSS) coordinates as an example. A geo-fence can be referred to as a virtual geographic boundary, such as the combination of a geographic coordinate and a radius around the geographic coordinate. The geofenced area can be formed or defined by a virtual perimeter surrounding the area corresponding to the delivery location 101 for a delivery. An interior area of a geo-fence may be any suitable size and any suitable shape. The virtual perimeter can correspond to a two-dimensional or a three-dimensional perimeter.

The delivery location 101 can also refer to a proximity threshold area surrounding the delivery location 101. In some examples, upon being within the proximity threshold, the delivery device 102 may attempt to discover client devices 104 located at the delivery location 101. For example, a geofence boundary may be established around the mailing address of a delivery location 101.

The discovery settings 136 can refer to different settings that can be adjusted in order to discover one or more client devices 104 at a delivery location 101. The discovery settings 136 can include different wireless protocols, radio frequency (RF) parameters, and other settings. The wireless protocols may include Wi-Fi®, Bluetooth®, Near Field Communication (NFC), Zigbee®, Z-Wave®, 6LoWPAN, Radio Frequency Identification (RFID), cellular 4G network, cellular 5G network, and other wireless protocols. The RF parameters may include adjustments to optimize the RF performance of wireless communication for the delivery device 102. The discovery settings 136 can also refer to establishing data communication with sound wave signals and/or light pulsing signals.

In one example, a delivery device 102 may attempt to discover one or more client devices 104 by way of a first communication channel 115, such as a Wi-Fi protocol. In the event the delivery device 102 fails to discover a client device 104, the delivery device 102 may attempt to discover the client device 104 by way of a different communication channel 115, such as a Bluetooth protocol. The discovery settings 136 can also include adjusting other parameters, such as RF frequency parameters, a different location within the proximity threshold area for device discovery, and other settings.

The device classification 142 can refer to a type or a category of client device 104 at the delivery location 101. For example, the device classification 142 may refer to different categories of IoT devices or smart home appliances. Some non-limiting examples include a refrigerator, a television, a security camera, doorbell, a security control panel, a lighting control apparatus, a thermostat, a voice assistant device, and other network accessible client devices 104. The device classification 142 can indicate that the client device 104 is mobile or fixed. The device classification 142 can be used to select discovery settings 136. For example, the validation service 121 may provide data indicating that the delivery location 101 has a client device 104 classified as a doorbell for validating the identity of the package recipient and/or delivery location. In this example, the delivery device 102 can adjust its discovery settings 136 in order to communicate with a doorbell. These adjustments may include which wireless communications protocols are available on the doorbell device, a typical distance for which a doorbell can communicate, and other communication parameters related to a doorbell device.

The encryption key data 139 can refer to encryption keys sent to the computing environment 103 from the client device 104 for validating a particular delivery location 101 for a delivery agent. At the appropriate time, the computing environment 103 can relay the encryption key data 139 to the delivery device 102. In one example, the client device 104 may generate a public-private key pair and send the public key 169 to the computing environment 103, which can be relayed to the delivery device 102 at the appropriate time for validation at the delivery location 101.

The delivery metrics data 130 can represent data related to tracking the successes and/or failures of deliveries by delivery agents. The delivery metrics data 130 can include delivery confirmation data 145, device confirmation data 148, or other delivery related statistics.

The delivery confirmation data 145 can refer to data generated from successful delivery attempts and failed delivery attempts by way of the validation service 121. The data may also include a delivery attempt location. For instance, a delivery agent may store, via the delivery device 102, a delivery attempt location in which the delivery agent attempted to validate the delivery location 101. The delivery device 102 can indicate whether the delivery attempt resulted in a success or a failure at its current location. For example, if a failure is indicated, the delivery metrics data 130 can store the current location as a failure for the specified delivery location 101. The delivery metrics data 130 can be available to the other delivery agents on subsequent delivery attempts.

The device confirmation data 148 can refer to data collected with respect to client devices 104 interacted with the delivery device 102 during a delivery attempt for a delivery location 101. For instance, the delivery device 102 can store data on a number of client devices 104 that were discovered and/or whether the client devices 104 provided a validation notification during a delivery attempt. The delivery device 102 may store data related to an estimated location of the client device 104 with respect to the delivery location, which may be estimated based on a receive strength signal strength indicator (RSSI) measurement. The delivery device 102 may also obtain device classification 142 data from the client device 104. Accordingly, characteristics associated with the client devices 104 can be collected without identity information related to the recipient, such as a customer account, a name, or other customer identifying information, being exchanged with the delivery device 102.

The client device 104 is representative of a plurality of client devices that may be coupled to the network 105 and/or the communication channel 115. The client device 104 can refer to a network accessible appliance or IoT device. Some non-limiting examples include a refrigerator, a thermostat, a security panel, a security camera, or other suitable devices. The client device 104 may also comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 104 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 104 can also include a transceiver 150 for communicating via the network 105 and/or the communication channel 115. The transceiver 150 can represent a hardware component capable of wired or wireless data communication. The transceiver 150 can be representative of a plurality of different transceivers in the client device 104, such as an Ethernet transceiver, a Wi-Fi transceiver, a Bluetooth transceiver, Zigbee transceiver, a Near Field Communication (NFC) transceiver, a radio frequency identification (RFID) transceiver or other suitable transceivers. The client device 104 can also be equipped with a microphone, a speaker, a light emitting device, sensors, and other suitable components for a client device.

The client device 104 may be configured to execute various applications such as a recipient validation application 151, a client application 154, and/or other applications. The recipient validation application 151 can be executed in client device 104, for example, to participate in a package delivery validation process, which may involve interacting with the validation service 121 and/or the delivery device 102. The recipient validation application 151 may communicate data over the network 105 and/or the communication channel 115.

The client application 154 can be executed in a client device 104 to perform one or more appliance or IoT-related tasks. For example, in the event that the client device 104 is associated with a refrigerator system, the client application 154 may perform tasks related to controlling and monitoring the operations of the refrigerator. In another aspect, the client application 154 may be used to control the operations of a thermostat.

The client application 154 may also be executed in the client device 104, for example, to access network content served up by the computing environment 103 and/or other servers, thereby rendering a user interface on the display. To this end, the client application 154 may comprise, for example, a browser, a dedicated application, etc., and the user interface may comprise a network page, an application screen, etc. The client device 104 may be configured to execute applications beyond the client application 154 such as, for example, email applications, social networking applications, word processors, spreadsheets, and/or other applications.

Also, various data is stored in a client data store 157 that is accessible to the client device 104. The client data store 157 may be representative of a plurality of data stores 157 as can be appreciated. The data stored in the client data store 157, for example, is associated with the operation of the various applications and/or functional entities described herein.

The client data store 157 may include encryption key pair data 160, device classifications 142 delivery instructions 166, and other client data. The encryption key pair data 160 may include data on public keys 169, private keys 172, and other encryption data. The public key 169 and private keys 172 can be generated as key pairs. Thus, the encryption key pair data 160 can represent an asymmetric cryptographic key pair that can include a public key 169 and a corresponding private key 172. For example, the encryption key pair data 160 can correspond to a key pair for the Rivest, Shamir and Adleman (RSA) algorithm, the Elgamal encryption algorithm, or various elliptic curve cryptographic (ECC) algorithms. The encryption key pair data 160 of a client device 104 can be used to validate the identity of the delivery recipient, the delivery location 101, and/or the delivery agent.

In one example, the encryption key pairs 160 may expire after a predefined time period in order to prevent unauthorized use of the encryption key pair 160. In another example, a client device 104 can generate a new encryption key pair 160 for every expected delivery for a delivery location 101. This approach ensures that if an encryption key pair 160 is stolen or otherwise compromised, only a particular delivery is at risk. All other attempts for identity validation of deliveries would still be secure.

The device classification 142 can refer to a device categorization of the client device 104. The device classification 142 may be originally set by the client device 104 by a manufacturer of the client device 104 or can be configured manually by an operator of the client device 104. Some non-limiting examples include a refrigerator, a television, a security camera, doorbell, a security control panel, a lighting control apparatus, a thermostat, a voice assistant device, and other network accessible client devices 104.

The delivery instructions 166 can refer to instructions provided by the client device 104 to the delivery device 102 for a delivery. For example, the delivery location may be at a facility with different areas. The delivery device 102 may be validated at a particular client device 104 that provides instructions to the delivery agent for dropping off a package.

For instance, the delivery device 102 may validate the identity of a client device 104 at a lobby area or a reception's desk. The client device 104 may provide a validation notification to the delivery device 102 that includes instructions for a different location for dropping off the package. The instructions may provide an indication for dropping off a package at a particular mailroom.

In some examples, the instructions may include a uniform resource indicator (URI), such as a uniform resource locator (URL), for the delivery device 102 to access location details for dropping off the delivery. In one implementation, the activation of the URL may cause a network page to render a floor layout of the facility with a marker indicating the drop-off location for the package. In some implementations, the delivery instructions 166 may be provided to the computing environment 103 by the client device 104 and/or the delivery device 102.

The delivery device 102 is representative of a plurality of delivery devices that may be coupled to the network 105 and/or the communications channel 115. The delivery device 102 may comprise, for example, a processor-based system such as a computer system. Such a computer system may be embodied in the form of a laptop computer, personal digital assistants, cellular telephones, smartphones, web pads, tablet computer systems, electronic book readers, a wearable device, or other devices with like capability. The delivery device 102 may include a display 175. The display 175 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The delivery device 102 can also include a radio frequency (RF) transceiver 176 for communicating via the network 105 and/or the communication channel 115. The RF transceiver 176 can be representative of a plurality of different transceivers in the delivery device 102, such as a Wi-Fi transceiver, a Bluetooth transceiver, Zigbee transceiver, a cellular transceiver, a Near Field Communication (NFC) transceiver, a radio frequency identification (RFID) transceiver, or other suitable transceivers. The delivery device 102 can also be equipped with a microphone, a speaker, a light emitting device, a location detecting device (e.g. a GPS unit), sensors, and other suitable components for a mobile device.

The delivery device 102 may be configured to execute various applications such as a validation application 178 and/or other applications. The validation application 178 may be executed in the delivery device 102 in order to validate the identity of a delivery location 101 or a delivery recipient for the delivery agent. The validation application 178 may also be executed, for example, to access network content served up by the computing environment 103 and/or other servers, thereby rendering a user interface on the display 175. To this end, the validation application 178 may comprise, for example, a browser, a dedicated application, etc., and the user interface may comprise a network page, an application screen, etc. The delivery device 102 may be configured to execute applications beyond the validation application 178 such as, for example, email applications, social networking applications, word processors, spreadsheets, and/or other applications.

Also, various data is stored in a delivery data store 181 that is accessible to the delivery device 102. The delivery data store 181 may be representative of a plurality of data stores as can be appreciated. The data stored in the delivery data store 181, for example, is associated with the operation of various applications and/or functional entities described herein. The delivery data store 181 may store data received from the computing environment 103 and/or the client device 104, such as delivery data 127, encryption key data 139, and delivery instructions 166.

Figure 2:
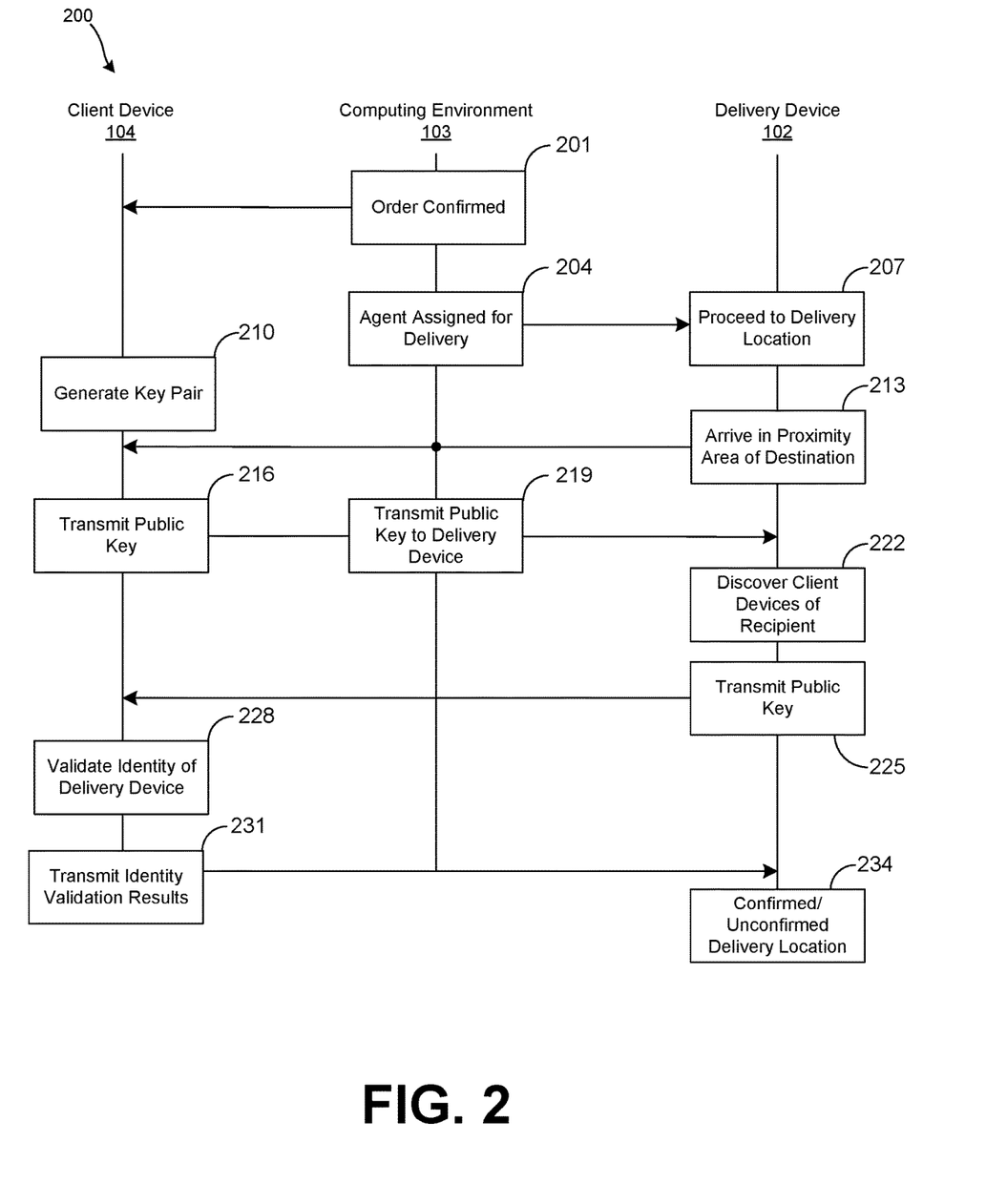
FIG. 2 is a timing sequence of the operations of the networked environment for FIG. 1B according to various embodiments of the present disclosure.

Moving on to FIG. 2, shown is an exemplary timing sequence of a validation process 200 of the networked environment 110 for FIG. 1B. The timing sequence of the validation process 200 illustrates the operation of the various components of the networked environment 110 from FIG. 1B. It should be noted that the FIG. 2 illustrates one example timing sequence among several other possible implementations of the present disclosure. FIG. 2 and the following discussion represent a general description of the operations of components in the networked environment 110 in FIG. 1B.

Beginning with step 201, it is assumed a customer has purchased a product at the electronic commerce system 124 (FIG. 1B). The validation process 200 can involve the client device 104 receiving an order confirmation of a purchased product from the computing environment 103. At step 204, the computing environment 103 can assign a delivery agent for delivery of the product. The delivery agent can store the delivery assignment 135 (FIG. 1B) in a delivery device 102. The delivery assignment 135 includes a delivery location 101 for the delivery of the product.

At step 207, the delivery device 102 can proceed to the delivery location 101 (FIG. 1B). The delivery device 102 can monitor its current location with respect to the delivery location 101. At step 210, the client device 104 can generate an encryption key pair 160 (FIG. 1B) for the delivery of the purchased product.

At step 213, the delivery device 102 can transmit an arrival notification to the computing environment 103. The arrival notification can represent that the delivery device 102 is within a proximity threshold of the delivery location 101. In some examples, the proximity threshold may be a geofence boundary established around the delivery location 101. In some examples, the computing environment 103 can transmit the arrival notification to the client device 104.

At step 216, the client device 104 can transmit a public key 169 (FIG. 1B) of an encryption key pair 160 (FIG. 1B) to the computing environment 103, which can be relayed to the delivery device at step 219. The computing environment 103 may wait to transmit the public key 169 until the delivery device 102 is within the proximity threshold of the delivery location 101.

At step 222, the delivery device 102 can attempt to discover client devices 104 at the delivery location 101. For example, the delivery device 102 can scan one or more communication channels 115 (FIG. 1B) to identify client devices 104, such as home appliances, media devices, IoT devices, or other client devices 104 that have been configured to validate the identity of the customer or the delivery agent. Upon discovering one or more client devices 104, the validation process 200 proceeds to step 225.

At step 225, the delivery device 102 can transmit the public key 169 to the discovered client device 104 for validation that the current location of the delivery device 102 is the expected delivery location 101 for the delivery. At step 228, the client device 104 can perform a decryption process that validates whether the received public key 169 corresponds to the delivery location 101 for an expected delivery package. The decryption process can involve using the private key 172 in order to validate the received public key 169.

At step 231, after decrypting the public key 169, the client device 104 can transmit an identity validation notification to the delivery device 102. The identity validation notification can notify the delivery device 102 whether the public key 169 was validated or rejected. Accordingly, at step 234, the delivery device 102 can interpret the identity validation notification received from the client device 104. Upon being validated, the delivery device 102 can render on the display 175 an indication that the delivery location is validated. Then, the delivery agent can proceed to drop the delivery package at its current location. In contrast, if the identity validation notification does not validate the public key, the delivery device 102 can render on the display 175 an indication that the current location is not validated. Then, the delivery agent can use various approaches for identifying another physical location as the expected delivery location. Alternatively, the delivery agent can classify the delivery attempt as a failure and proceed to delivery another package for a different customer.

Figure 3:
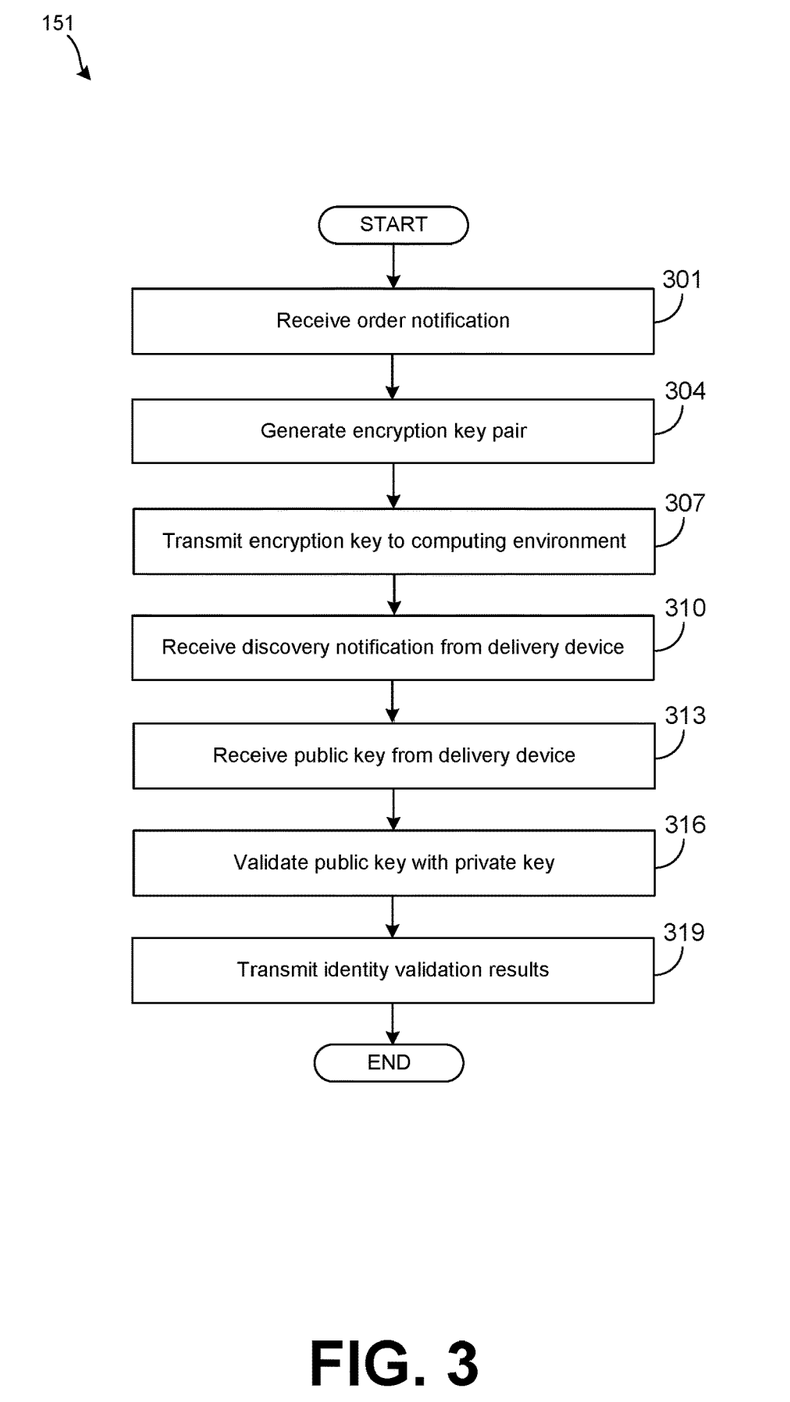
FIG. 3 is a flowchart illustrating one example of functionality implemented as portions of a recipient validation application executed in a client device in the networked environment of FIG. 1B according to various embodiments of the present disclosure.

Referring next to FIG. 3, shown is a flowchart that provides one example of the operation of a portion of the recipient validation application 151 according to various embodiments. It is understood that the flowchart of FIG. 3 provides merely an example of the many different types of functional arrangements that may be employed to implement the operation of the portion of the recipient validation application 151 as described herein. As an alternative, the flowchart of FIG. 3 may be viewed as depicting an example of elements of a method implemented in the computing environment 103 (FIG. 1B) according to one or more embodiments.

Beginning with step 301, it is assumed a product was purchased by a user from an electronic commerce system 124 (FIG. 1B). While completing the purchase, the user provides the electronic commerce system 124 with a delivery location 101 (FIG. 1B) for the purchased product. In some examples, it is also assumed that the user opted-in to enable a delivery agent to use a validation service 121 (FIG. 1B) for verifying the proper delivery location 101 for delivery of the product. Accordingly, the recipient validation application 151 can involve receiving an order notification from the electronic commerce system 124 and/or the validation service 121. In some examples, one or more client devices 104 (FIG. 1B) located at the delivery location 101 can be selected or configured by the user to interact with the computing environment 103 in order to receive the order notification.

At step 304, the recipient validation application 151 can involve generating an encryption key pair 160 (FIG. 1B). In some examples, the recipient validation application 151 generates the encryption key pair 160 after receiving an arrival notification of the delivery device 102 (FIG. 1B) being located within a proximity threshold of the delivery location 101. The recipient validation application 151 can use various asymmetric cryptography techniques, such as Diffie-Hellman key exchange, Rivest-Shamir-Adleman (RSA), and other suitable encryption techniques. In some examples, the recipient validation application 151 may generate the encryption key pair 160 after receiving the order notification. The encryption key pair 160 can be configured for a one-time use for the particular delivery or can be set to expire after a predefined period of time in order to prevent unauthorized use of the encryption keys.

At step 307, the recipient validation application 151 can transmit an encryption key data 139 to the computing environment 103. For example, the recipient validation application 151 can transmit a public key 169 of an encryption key pair 160. The recipient validation application 151 can store the private key 172 (FIG. 1B) in the client data store 157 for validating the delivery device 102 at a subsequent point in the delivery. The computing environment 103 can relay the encryption key data 139 to the delivery device 102 at an appropriate stage in the delivery.

At step 310, the recipient validation application 151 can receive a discovery notification from the delivery device 102. In some embodiments, the recipient validation application 151 can transmit a discovery acknowledgement to the delivery device 102 in response to receiving the discovery notification. For instance, the discovery notification and the discovery acknowledgement can comprise a pinging process to recognize the existence of one or more client devices 104 at the delivery location 101.

At step 313, the recipient validation application 151 can receive the encryption key data 139 from the delivery device 102. Upon arriving within a proximity threshold of the delivery location 101, the delivery device 102 can receive encryption key data 139 from the computing environment 103. For example, upon arriving within 15-20 meters of the delivery location 101, the delivery device 102 can then transmit a public key 169 to the client device 104 for validation of the delivery location 101 and the identity of the intended recipient for a particular package.

At step 316, the recipient validation application 151 can determine whether to validate the encryption key data 139 provided by the delivery device 102. Continuing with the previous example, the recipient validation application 151 can use encryption techniques to validate the received public key 169. In this example, the recipient validation application 151 can validate the public key 169 by decrypting or validating the public key 169 with the private key 172, which was generated with the public key 169 as an encryption key pair 160.

At step 319, the recipient validation application 151 can transmit identity validation results to the delivery device 102 after the received encryption key data 139 has been decrypted. For example, if the public key 169 is decrypted using the private key 172, the recipient validation application 151 can transmit an identity validation notification to the delivery device 102.

In some examples, the delivery location 101 may be located in a facility with various sections. In these scenarios, the identity validation notification may include delivery instructions 166 to further direct to the delivery agent to the particular delivery location 101. In one non-limiting example, the delivery instructions may include a description that the delivery agent can use for navigating to the particular delivery location 101. In other examples, the delivery instructions 166 may include a URL, which upon activation may cause a network page to render a floor layout of the facility. The floor layout can include a marker representing the particular delivery location 101.

By contrast, if the recipient validation application 151 fails to validate the public key 169, the client device 104 can transmits a failed validation notification to the delivery device 102. The failure to validate the delivery location 101 can indicate that the delivery agent is not at the delivery location 101 for the delivery. The delivery agent may then try various methods to identify another location for validating the delivery location 101. Then, the recipient validation application 151 can proceed to the end.

Figure 4:
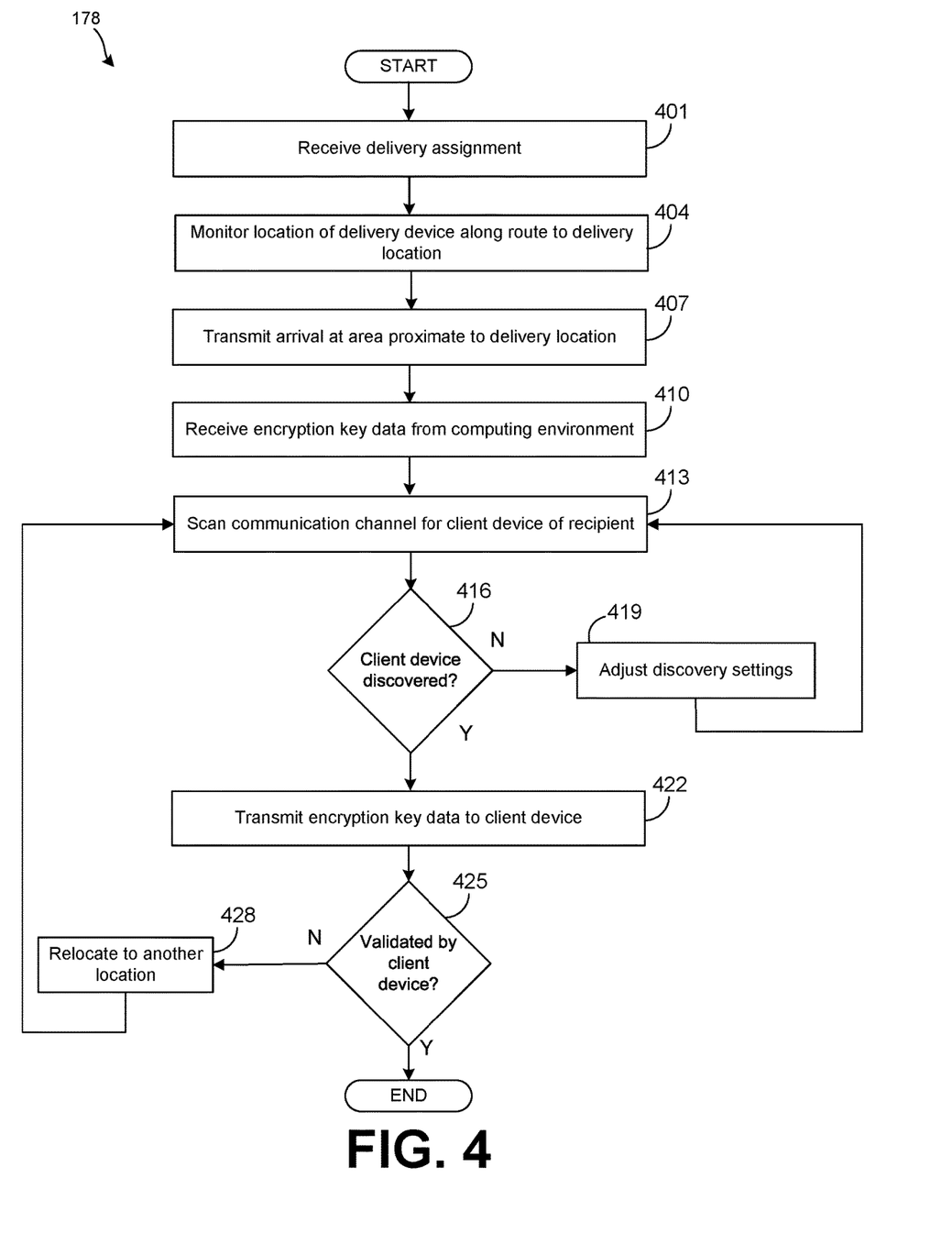
FIG. 4 is a flowchart illustrating one example of functionality implemented as portions of a validation application, executed in a delivery device in the networked environment of FIG. 1B according to various embodiments of the present disclosure.

Referring next to FIG. 4, shown is a flowchart that provides one example of the operation of a portion of the validation application 178 according to various embodiments. It is understood that the flowchart of FIG. 4 provides merely an example of the many different types of functional arrangements that may be employed to implement the operation of the portion of the validation application 178 as described herein. As an alternative, the flowchart of FIG. 4 may be viewed as depicting an example of elements of a method implemented in the computing environment 103 (FIG. 1B) according to one or more embodiments.

Beginning with step 401, it is assumed that a customer has placed an order for a product with the electronic commerce system 124 (FIG. 1B). As part of the fulfillment of the purchase order, the validation application 178 can receive a delivery assignment 135 (FIG. 1B) for the purchase order at a delivery location 101 (FIG. 1B).

At step 404, the validation application 178 monitors the current location of the delivery device 102 (FIG. 1B) along a route to the delivery location 101. In some embodiments, the validation application 178 may provide a delivery route from the current location of the delivery device 102 to the delivery location 101. As a vehicle transporting the delivery device 102 progresses along the delivery route, the validation application 178 can estimate a distance from the current location of the delivery device 102 to a point within a proximity threshold of the delivery location 101.

At step 407, the validation application 178 can transmit an arrival notification to the computing environment 103 upon the delivery device 102 being within a proximity threshold of the delivery location 101. In some embodiments, the transmission of an arrival notification to the computing environment 103 may be omitted.

At step 410, the validation application 178 can receive encryption key data 139 from the computing environment 103. Continuing with a previous example, the encryption key data 139 (FIG. 1B) can refer to a public key 169 that was transmitted from the client device 104 to the computing environment. Then, the public key 169 (FIG. 1B) is relayed from the computing environment 103 to the delivery device 102 at the appropriate time. In some embodiments, the validation application 178 can receive the encryption key data 139 once the delivery device 102 is within a proximity threshold of the delivery location 101. Further, the validation application 178 may remove or delete the public key 169 from the delivery data store 181 (FIG. 1B) upon the delivery device 102 being outside of the proximity threshold to the delivery location 101.

At step 413, the validation application 178 can scan communication channels 115 in order to discover one or more client devices 104 at the delivery location 101. In some examples, a communication channel 115 (FIG. 1B) can comprise a Wi-Fi network, a Bluetooth channel, a NFC channel, a Zigbee channel, or other communication channels. In other examples, the validation application 178 may transmit a sound wave signal, a pulsing light signal, or other signal in order to discover client devices 104.

In one embodiment, the validation application 178 can select a communication channel 115 for discovering one or client devices 104 based on various factors. In one non-limiting example, the validation application 178 may select a communication channel 115 based on the device classification 142 (FIG. 1B) provided by the computing environment 103. The computing environment 103 may obtain device classification 142 from the client device 104 without receiving identifying information of the customer. For example, the delivery device 102 may receive device classification 142 related to a client device 104 being classified as a doorbell device. In this context, the delivery device 102 can select a communication channel 115 that is compatible with the capabilities of a doorbell device. This context may be a factor in the delivery device 102 selecting to discover the client device 104 using a NFC protocol or a Bluetooth protocol.

In another non-limiting example, the validation application 178 may select a communication channel 115 based on discovery settings 136, such as optimal radio frequency parameters considering the structural environment nearby or surrounding the delivery location 101. For example, the delivery device 102 may select a communication channel 113 based on the delivery device's 102 likelihood of having the best RF performance considering the structural environment of the current location of the delivery device 102.

At step 416, the validation application 178 can determine whether one or more client devices 104 have been discovered at the delivery location 101. In some aspects, the validation application 178 may transmit a discovery notification in an area at the delivery location 101. Client devices 104 that receive the discovery notification can respond by transmitting an acknowledgement notification back to the client device 104. If the delivery device 102 fails to discover a client device 104, then the validation application 178 can proceed to step 419. Upon discovering one or more client devices 104, the validation application 178 can proceed to step 422.

At step 419, the validation application 178 can adjust the discovery settings 136 (FIG. 1B) for a second attempt at discovering one or more client devices 104. Adjusting the discovery settings 136 may involve selecting a different communication channels 115 since a previous communication channel 115 failed. In other cases, an adjustment may involve adjusting RF parameters for the communication channels 115. In another case, an adjustment may involve the delivery device 102 suggesting a different location for discovering client devices 104 based on a previous delivery attempt.

At step 422, the validation application 178 can transmit the encryption key data 139 to the discovered client devices 104. As discussed in previous non-limiting examples, the encryption key data 139 can refer to a public key 169. The validation application 178 can transmit the public key 169 to the discovered client devices 104. In some embodiments, when more than one client device 104 is discovered, the validation application 178 can filter out one or more client device 104 for transmitting the public key 169. For instance, in an apartment building, the delivery device 102 may discover client devices 104 from surrounding apartment units. In one embodiment, the validation application 178 filters out one or more client devices 104 based on RSSI measurements received from an acknowledgment notification from the client devices 104.

At step 425, the validation application 178 can determine whether it has received an identity validation notification from the client devices 104 that were sent the public key 169. If the validation application 178 fails to receive an identity validation notification, then the validation application 178 proceeds to the step 428.

In one example, the validation application 178 may determine an updated delivery location based on the identity validation notification received from one or more client devices 104. The validation application 178 can determine an RSSI measurement from the identity validation notification. The identity validation notification can be used to estimate a distance and/or direction from the current location of the delivery device 102 to the client device 104 that transmitted the identity validation notification. Then, the validation application 178 proceeds to the end.

At step 428, the validation application 178 can involve determining an estimation location for a second attempt at verifying the identity of a client device 104. In some examples, the validation application 178 can prompt the delivery agent via a user interface on the delivery device to move to a different location. The validation application 178 may render on the display 175 a different location for the delivery agent to move to based on the discovered client devices 104 that were filtered out. At this stage, the validation application 178 can proceed to step 413 to discover client devices 104 at the updated location.

Figure 5:
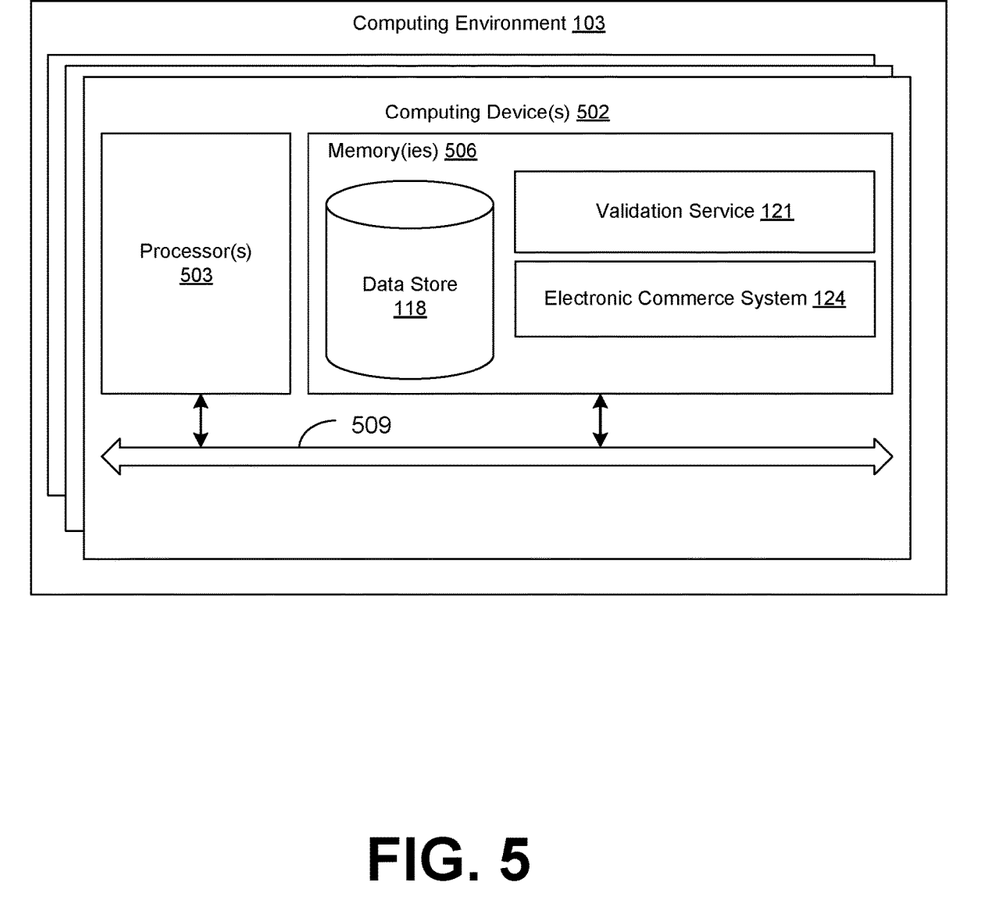
FIG. 5 is a schematic block diagram that provides one example illustration of a computing environment employed in the networked environment of FIG. 1B according to various embodiments of the present disclosure.

With reference to FIG. 5, shown is a schematic block diagram of the computing environment 103 according to an embodiment of the present disclosure. The computing environment 103 includes one or more computing devices 502. Each computing device 502 includes at least one processor circuit, for example, having a processor 503 and a memory 506, both of which are coupled to a local interface 509. To this end, each computing device 502 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the validation service 121 and the electronic commerce system 124, and potentially other applications. Also stored in the memory 506 may be a data store 118 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the validation service 121, the recipient validation application 151, the validation application 178, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and timing sequences diagrams of FIGS. 2-4 show the functionality and operation of an implementation of portions of the recipient validation application 151 and the validation application 178. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts and sequence diagrams of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the validation service 121, the recipient validation application 151, the validation application 178, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the validation service 121, the recipient validation application 151, the validation application 178, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 502, or in multiple computing devices 502 in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations Therefore, the following is claimed:

1. A system, comprising:
a computing device; and
an application executed in the computing device, wherein the application, when executed, causes the computing device to at least:
determine a current location of the computing device is within a proximity threshold of a location;
transmit, via a first network, an arrival indication to a remote computing device;
receive, via the first network, an encryption key from the remote computing device;
determine a second network for discovering a first client device at the location based at least in part on a device classification of the first client device located at the location;
detect the first client device located at the location through the second network;
transmit, via the second network, the encryption key to the first client device for validation that the current location of the computing device is the location;
receive, via the second network, a plurality of validated identity notifications for the encryption key from the first client device and a second client device, the plurality of validated identity notifications being associated with a plurality of signal strengths; and
determine an updated delivery location based at least in part on a selected signal strength from the plurality of signal strengths.

2. The system of claim 1, wherein the proximity threshold of the location is based at least in part on a geo-fence boundary surrounding the location.

3. The system of claim 1, wherein the location is a delivery location for a package.

4. The system of claim 1, wherein the encryption key is a public key that is associated with an encryption key pair that comprises a private key.

5. The system of claim 1, wherein detecting the first client device located at the location further comprises scanning the second network for the client device.

6. The system of claim 1, wherein detecting the first client device located at the location further comprises transmitting a signal.

7. The system of claim 6, wherein the signal comprises a first signal, and transmitting the encryption key to the first client device further comprises transmitting to the first client device a second signal embedded with the encryption key.

8. The system of claim 1, wherein detecting the first client device located at the location further causes the computing device to at least:
scan the second network on a first attempt to detect the first client device based at least in part on a first discovery setting; and
select a second discovery setting to detect the first client device on a second attempt in response to a failure to detect the first client device with the first discovery setting.

9. A method, comprising:
transmitting, via a computing device, an arrival notification to a remote computing device based at least in part on the computing device being within a proximity threshold of a delivery location;
receiving, via the computing device, encryption key data from the remote computing device through a first network;
determining, via the computing device, a second network for scanning a first client device at the delivery location based at least in part on a device classification of the first client device located at the delivery location;
scanning, via the computing device, the second network for the first client device located at the delivery location;
transmitting, via the computing device, the encryption key data to the first client device and a second client device in response to detecting the first client device, the encryption key data being transmitted for validation that the computing device is at the delivery location;
receiving, via the computing device, a plurality of validated identity notifications for the encryption key data from the first client device and a second client device, the plurality of validated identity notifications being associated with a plurality of signal strengths; and
determining, via the computing device, an updated delivery location based at least in part on a selected signal strength from the plurality of signal strengths.

10. The method of claim 9, wherein the delivery location comprises at least one of a street address or a global navigation satellite system(GNSS) coordinate location.

11. The method of claim 9, wherein the validated identity notification from the first client device, the validated identity notification comprising a uniform resource identifier (URI) that, upon activation, causes a network page to render delivery instructions for a facility associated with the delivery location.

12. The method of claim 11, wherein the network page is configured to render a layout of the facility and a marker on the layout that represents the delivery location.

13. The method of claim 9, wherein scanning the second network for the first client device located at the delivery location further comprises:
determining, via the computing device, a failure to detect the first client device on the second network on a first attempt; and
selecting, via the computing device, a different radio frequency parameter to scan for the first client device on a second attempt.

14. The method of claim 9, wherein the encryption key is a public key that is associated with an encryption key pair that comprises a private key.

15. A non-transitory computer-readable medium embodying a program executable a computing device, comprising:
determine a current location of the computing device is within a proximity threshold of a location;
transmit, via a first network, an arrival indication to a remote computing device;
receive, via the first network, an encryption key from the remote computing device;
determine a second network for discovering a first client device at the location based at least in part on a device classification of the first client device located at the location;
detect the first client device located at the location through the second network;
transmit, via the second network, the encryption key to the first client device and a second client device for validation that the current location of the computing device is the location;

receive, via the second network, a plurality of validated identity notifications for the encryption key from the first client device and the second client device, the plurality of validated identity notifications being associated with a plurality of signal strengths; and determine an updated delivery location based at least in part on a selected signal strength from the plurality of signal strengths the signal strength.

16. The non-transitory computer-readable medium of claim 15, wherein the encryption key is a public key that is associated with an encryption key pair that comprises a private key.

17. The non-transitory computer-readable medium of claim 15, wherein the location is a delivery location, and the proximity threshold of the delivery location is based at least in part on a geo-fence boundary surrounding the delivery location.

* * * * *